United States Patent [19]
Payton

[11] 3,921,124
[45] Nov. 18, 1975

[54] MARINE 3-D SEISMIC METHOD USING SOURCE POSITION CONTROL

[75] Inventor: Charles E. Payton, Ponca City, Okla.

[73] Assignee: Continental Oil Company, Ponca City, Okla.

[22] Filed: Mar. 18, 1974

[21] Appl. No.: 451,736

[52] U.S. Cl. .......................... 340/7 R; 340/15.5 CP
[51] Int. Cl.² ............................................. G01V 1/38
[58] Field of Search...... 340/7 R, 15.5 CP, 15.5 MC

[56] References Cited
UNITED STATES PATENTS

| | | | |
|---|---|---|---|
| 3,806,863 | 4/1974 | Tilley et al. | 340/7 R |
| 3,840,845 | 10/1974 | Brown | 340/7 R |

*Primary Examiner*—Maynard R. Wilbur
*Assistant Examiner*—H. A. Birmiel
*Attorney, Agent, or Firm*—William J. Miller

[57] ABSTRACT

An improved method for deriving three dimensional seismic information in a marine environment by the use of a single conventional hydrophone streamer cable and one or more remote controllable mobile seismic sources, the positions of which are systematically controlled. Movement of the seismic sources along a periodic path facilitates, through the use of well-known techniques, the determination of common depth point data along a plurality of lines parallel to the line of survey, thereby producing three dimensional seismic information.

15 Claims, 6 Drawing Figures

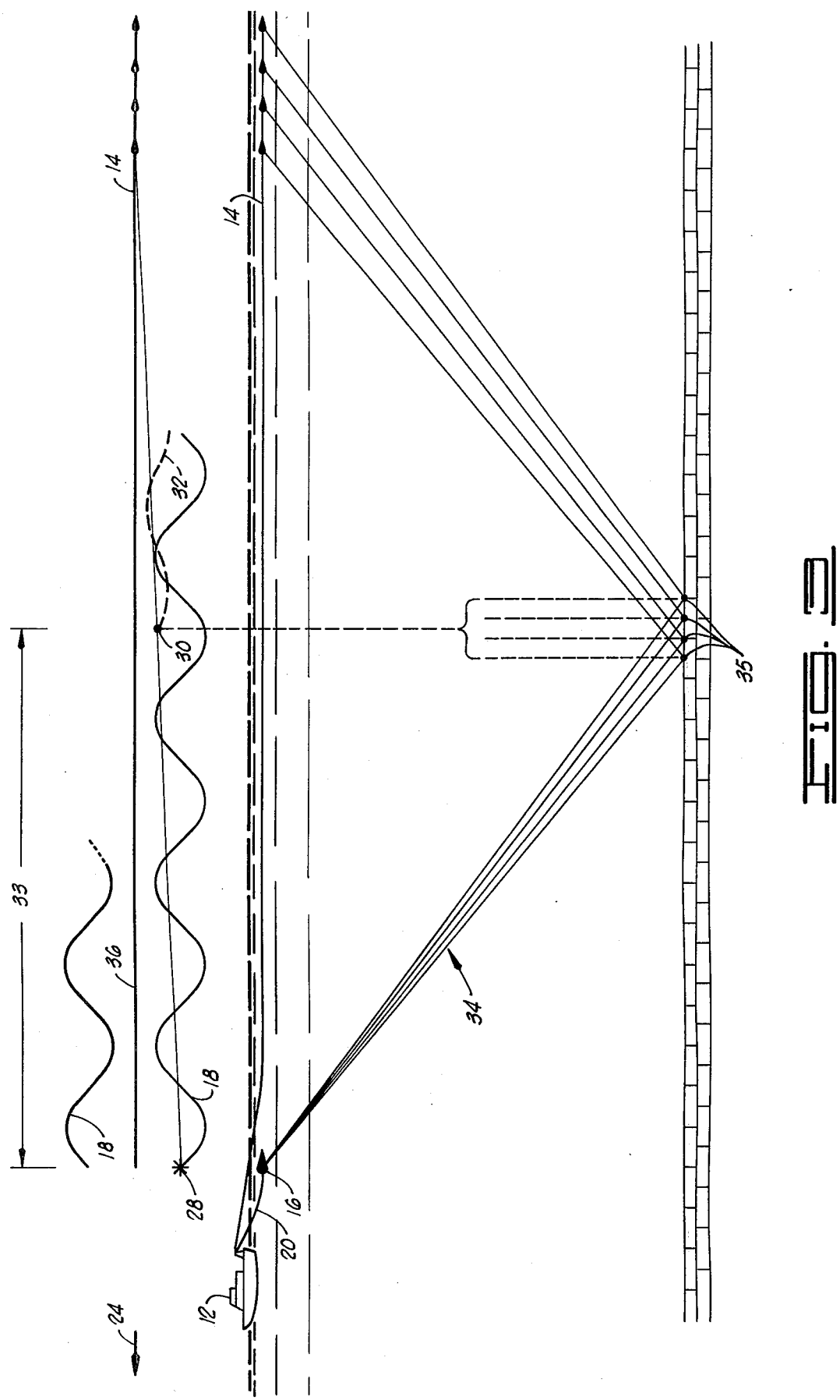

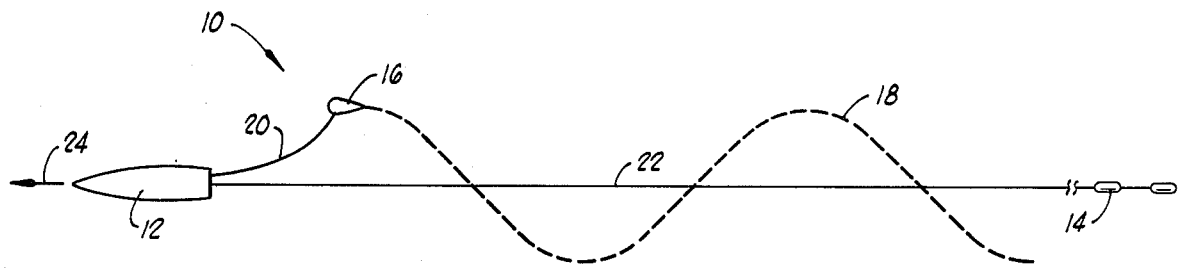
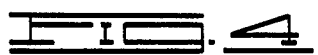
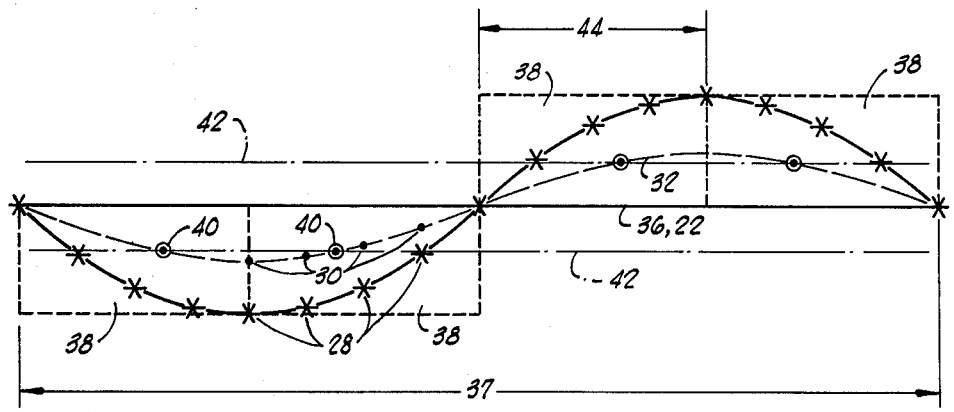
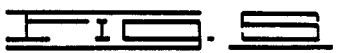
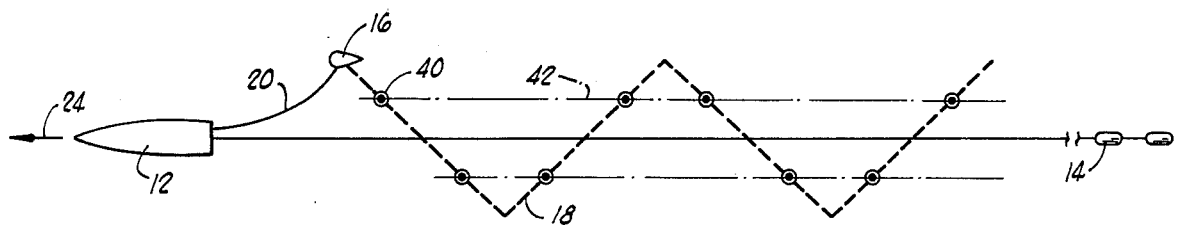
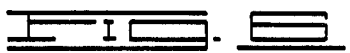

MARINE 3-D SEISMIC METHOD USING SOURCE POSITION CONTROL

BACKGROUND OF THE INVENTION

1. Field of the Invention

This invention relates generally to geophysical prospecting systems and, more particularly, but not by way of limitation, to improvements in marine seismic prospecting methods wherein three-dimensional seismic information is derived from a single conventional hydrophone streamer cable and one or more remote controllable mobile seismic sources, the positions of which are systematically controlled.

2. Description of the Prior Art

The prior art in the field of seismic prospecting in a marine environment consists primarily of the use of a single conventional hydrophone streamer cable and a plurality of fixed seismic sources arrayed in relatively close proximity to the survey vessel. An alternate system utilizes a plurality of fixed hydrophone streamer cables in addition to the plurality of fixed sources. Both of these methods in general require more discrete hardware units and produce more narrowly spaced lines of data thereby giving significantly less threedimensional resolution than the present invention.

SUMMARY OF THE INVENTION

The present invention contemplates a geophysical prospecting method in a marine environment wherein one or more remote-controllable mobile seismic sources are disposed in generally periodic patterns on either side of a conventional hydrophone streamer cable and activated in a manner to produce seismic data points which when processed using existing techniques yields a plurality of lines of seismic data parallel to the line of survey.

An object of the invention is to produce a geophysical prospecting method in a marine environment which yields three-dimensional seismic information of a relatively large cross-sectional area.

Another object of the invention is to produce a geophysical prospecting method in a marine environment employing mobile seismic energy sources which allow broad three-dimensional seismic coverage while requiring a minimum of said sources.

Other objects and advantages of the invention will be evident from the following detailed description when read in conjunction with the accompanying drawings which illustrate various embodiments of the invention.

BRIEF DESCRIPTION OF THE DRAWINGS

FIG. 3 is a sectional view of the earth showing the path along which seismic energy could travel in a marine seismic survey system configured in accordance with the present invention.

FIG. 4 is a plan diagram showing a marine seismic survey vessel configured in accordance with the present invention and illustrating the path described by one type of systematic movement of a seismic source.

FIG. 5 illustrates in diagrammatical form the various seismic processing characteristics inherent in the use of the embodiment of this invention depicted in FIG. 4.

FIG. 6 is a plan diagram showing a marine seismic survey vessel configured in accordance with this invention and illustrating the path described by an alternate type of systematic movement of a seismic source.

DESCRIPTION OF THE PREFERRED EMBODIMENTS

Figure 1:
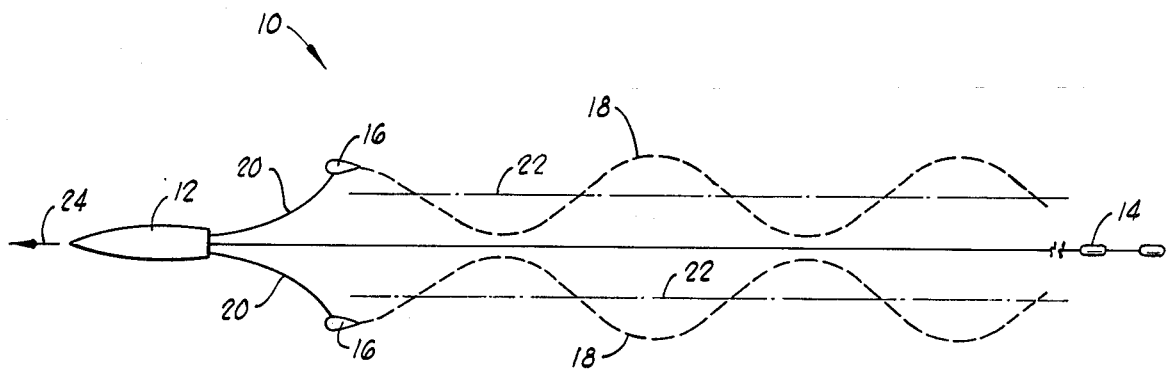
FIG. 1 is a plan diagram showing a marine seismic survey vessel configured in accordance with this invention and illustrating the path described by the systematic movement of two seismic sources.

Referring to FIG. 1, a marine seismic survey system 10 configured in accordance with the present invention consists of the survey vessel 12, a single conventional hydrophone streamer cable 14 with a leader sufficiently long to achieve acceptable source-receiver offsets, and two remote controlled mobile seismic sources 16. As the towing vessel 12 pulls the streamer 14 and sources 16 through the water, each source unit 16 is caused to describe essentially a sinusoidal pattern 18 in the horizontal plane with source motion controlled by any of various conventional apparatus such as a variable-pitch paravane, a propeller or a jet power device. The major axes 22 of the sinusoidal pattern 18 of the sources 16 lie parallel to the hydrophone streamer cable 14 and the line of survey 24. In order to maximize the three-dimensional seismic coverage, the source units are towed on long cables 20 allowing maximum lateral displacement of sine axes 22. Lateral towing forces on the survey vessel 12, will be balanced when an equal number of source units 16 are moved essentially symmetrically on either side of the hydrophone streamer cable 14.

While the seismic sources 16 employed in carrying out the invention may be any of the well-known mechanical types, sleeve exploder, gas gun, vibrator or the like, the method as will be further described uses the sleeve exploder to generate seismic energy. A vibration system would be advantageous if each operating source 16 has a distinctive frequency sequence to facilitate the separation and identification of reflections from simultaneously operating sources. Thus, with each source generating a different unique vibratory signal, received energy can be correlated for separate processing and the system functions to yield an increased number of data points per distance covered.

Figure 2:
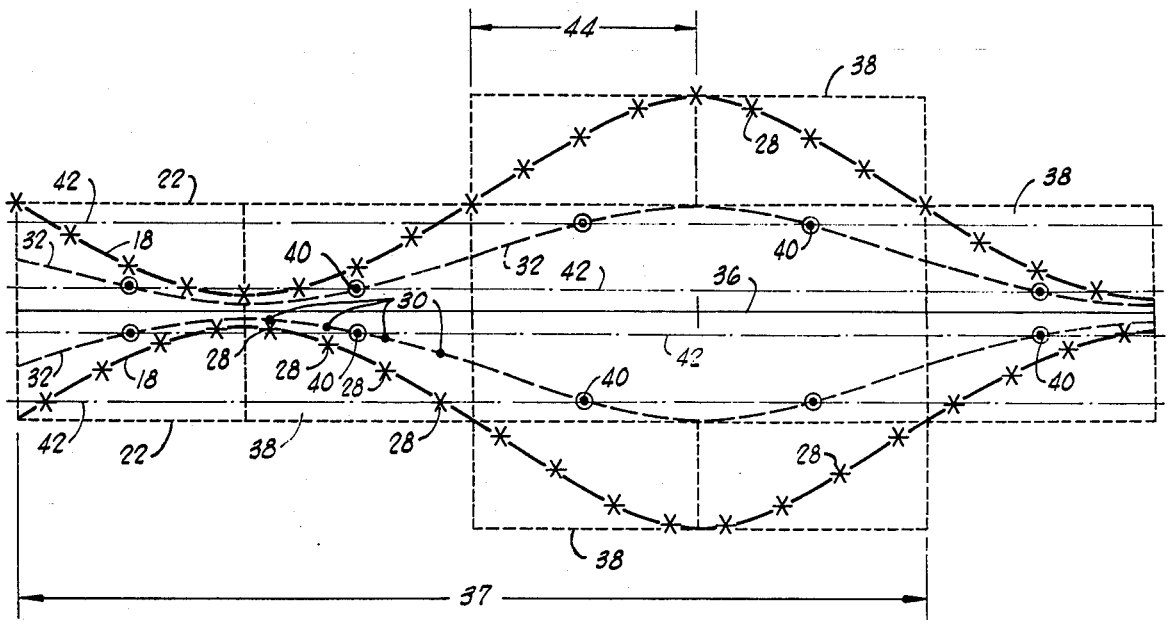
FIG. 2 illustrates in diagrammatical form the various seismic processing characteristics inherent in the use of the embodiments of the present invention depicted in FIG. 1.

In FIG. 2, the sinusoidal curves 18 represent the paths traced by the seismic sources as they are systematically moved in the surface plane. At specific points 28 along this curve, the sources are activated and returned seismic energy is recorded through the hydrophone receivers. The resulting seismic data points 30 lie in the sinusoidal curves 32 whose period is the same as the source curves 18 and whose amplitude is one-half that of the source curves 18 but with a phase displacement along the line of survey toward the hydrophone receivers which is related to one-half the distance between sources and receivers. In FIG. 3, this phase displacement 33 is graphically illustrated in the hypothetical sectional and surface views of the survey system of FIGS. 1–2. FIG. 3 shows, in simplified and exaggerated form the paths 34 traced by seismic energy generated by a source 16 and recorded by the plurality of receivers located in the streamer cable 14. While the number of receivers located in the streamer cable 14 is typically greater (24–48 channels of 15–20 receivers per channel) and the distance between each receiver is smaller in relation to the length of the streamer cable 14, FIG. 3 is useful in illustrating the spatial relationship along the line of survey 24 between the source activation point 28 lying on the sinusoidal pattern 18 and the resulting data point 30 lying on the sinusoidal pattern 32. Note that the individual data points 35 recorded by the individual receivers in the streamer cable 14 are "stacked", in a manner well known in the art, to produce a single data point 30 on the data curve 32. Removal of the phase difference 33 allows the representation as in FIG. 2, where both curves 18 and 32 are displayed in phase to emphasize the relationship between the source points 28 and data points 30.

Although the sinusoidal curves 18 on either side of the receiver path 36 are essentially symmetrical, the source activation points 28 alternate between the curves 18 giving a staggered appearance. For purposes of illustration, sixteen source activations 28 are shown per sine wave period 37. These firings or source points 28 are divided into logical groupings called compositing domains 38, of which four are shown per period 37. A compositing domain is defined for the purposes of the present invention to be the distance traveled along the line of survey equal to the length of streamer cable 14 required to contain a single receiver nest, as is well known in the art; and more specifically, to be 440 feet, as this is the distance covered by a receiver nest in conventional streamer cables 14 widely used in the art. All of the data points 30 derived from the firings 28 within a single compositing domain 38 are summed to produce a single fold trace, represented by the composited data points 40. The composited data points 40 can be combined using conventional techniques to produce a plurality of parallel lines 42 of seismic data. The configuration as depicted in FIG. 2 will produce four lines 42 of data after compositing. Uniform stacking on each data line 42 is produced when the order of stack is an even number. The order of stack is equal to the number of receiver channels in the hydrophone streamer divided by the number of firing 28 within a compositing domain 38. Spacing between the lines of data 42 is determined by the amplitude of the sine waves 18 and the lateral displacement of the sine waves axes 22 from the receiver path 36.

Using conventional receiver channel lengths 44, e.g. 440 feet, and a source paravane traverse speed of 10 feet / second, a system constructed as illustrated in FIGS. 1-2 would require each source 16 to have an 11 second duty cycle. The first half of this cycle is devoted to firing one source and recording the seismic return. The second half is inactive to permit firing of the alternate source. If the oscillation period is four channel lengths 44 (1760 feet) and the source paravanes can sustain an average lateral velocity of 10 feet / second, the total lateral distance covered by each source is 880 feet. Assuming the axes 22 of the sine waves 18 are displaced 440 feet on either side of the receiver path 36, the total width covered by the sources is 1760 feet. The data curves 32 would therefore cover a total lateral distance of 880 feet and the lines 42 of composite data points 40 would lie 330 feet and 110 feet on either side of the receiver path 36. Total swath width is that distance between the outermost lines 42 of composited data points, or in this example, a distance of 660 feet.

Greater swath width can be achieved in a number of ways:

1. Increase the lateral distance between the axes 22 of the sine waves 18 and the receiver path 36, i.e. move the sine waves away from the line of survey without changing their shape;
2. Increase the average lateral velocity of the paravanes thereby increasing the amplitude of the sine curves, i.e. cover more lateral distance for the same longitudinal distance;
3. Increase the period 37 of the sine waves 18 to cover move receiver channel lengths 44 without changing the average velocity of the paravanes, i.e. increase the time required to traverse one sinusoidal period 37 thereby allowing the paravane to cover more lateral distance per cycle; or
4. Combinations of the above changes to fit physical requirements.

As an example, to further clarify the effects of a change in the sine wave period 37, assume the period is increased to six receiver channel lengths 44 or 2640 feet. Since the paravane motion 18 should not intersect the receiver path 34, the lateral displacement of the sine wave axes 22 would therefore increase to 330 feet from 220 feet. Since each of the six receiver channel lengths 44 delimit a compositing domain 38 and contain a composite data point 40, there are now six lines 42 of composite data points, Using the same average lateral velocity of 10 feet / second, each paravane would achieve a maximum lateral displacement of 1,320 feet. The total swath, as delimited by the outermost lines 42 of composited data points 40, would be 1,100 feet.

It should be apparent that there will be derived one line 42 of composited data points 40 for each receiver channel length 44 contained in a single sinusoidal period 37, i.e. if the sinusoidal period 37 is "$x$" receiver channel lengths 44 in length, there will be "$x$" lines 42 of composited data points 40 derived. However, it should be equally apparent that the longer the sinusoidal period is made, the farther apart will be the composited data points 40 in each line 42 of data. It follows, therefore, that it is desirable to maintain a balance in the length of the sinusoidal period and the receiver channel length 44 so that the derived composited data points 40 are sufficiently close together along the lines 42 of data to achieve acceptable resolution in the direction of the line of survey and that a sufficient number of lines 42 of composited data points 40 are derived so as to achieve acceptable cross-line resolution. Such factors should be determined at the time of survey in accordance with the desired results.

FIGS. 4 and 5 illustrate the use of a single remote-controlled mobile seismic source 16 moved in essentially a sinusoidal pattern 18 in the horizontal plane, the major axis 22 of which lies essentially coextensively with the line of survey 24. The manner of operation and compositing of this embodiment is generally the same as that described above for two remote-controlled mobile seismic sources 18. It should be noted, however, that provision must be made to assure that the source 16 and source cable 20 do not engage or foul the hydrophone streamer cable 14 when the source 16 moves across the line of survey.

Although the method and preferred embodiments of this invention are described above in relation to periodic source motion in a sinusoidal pattern, other types of periodic motion are equally applicable. FIG. 6 illustrates an alternate type of periodic motion generally called a "sawtooth" pattern in which a single seismic source 16 is moved in a regular zig-zag pattern 18 back and forth across the line of survey 24. As described above the source 16 can be activated at regular intervals and the resulting recordings composited to derive composited data points 40 lying along data lines 42 essentially parallel to the line of survey 24. However, since sinusoidal motion is the most simple type of periodic motion, it would therefore be the easiest to produce and control.

Changes may be made in the construction and the arrangement of the parts or the elements of the various embodiments as disclosed herein without departing from the spirit and scope of the invention as defined in the following claims.

What is claimed is:

1. A method for three-dimensional seismic survey over a water-covered land mass, comprising the steps of:
    towing a paravane means which includes a seismic energy source means, from a tow vessel along a predetermined line of survey, said paravane means being controlled to proceed in a generally periodic path of pre-determined period about an axis parallel to said line of survey;
    towing a streamer including a plurality of seismic energy receivers behind said tow vessel such that said receivers are positioned along a line a predetermined distance from said axis; and
    controlling periodic energization of said source means and receiving returned seismic energy at said receivers to compile plural related lines of seismic energy trace data from said land mass.

2. A method as set forth in claim 1 which is further characterized in that:
    said paravane means consists of two such paravanes each containing a source and each towed outboard of the rear quarter of said tow vessel, and each is controlled such that said paravanes proceed along sinusoidal paths such that their sinusoidal axial paths are equi-spaced from said line of survey.

3. A method as set forth in claim 2 which is further characterized in that:
    said sinusoidal paths of each of said paravanes are controlled to proceed in 180° phase relationship.

4. A method as set forth in claim 3 wherein said step of controlling periodic energization further comprises steps of:
    controlling energization of said sources in each of said paravanes alternately at a preselected time-displacement with duration in which returned seismic energy from alternate sources is received by said seismic energy receivers.

5. A method as set forth in claim 3 which is further characterized in that:
    said seismic energy sources are vibrators and each is separately controlled to produce input seismic energy of different, unique frequency content.

6. A method as set forth in claim 5 wherein said step of controlling periodic energization comprises steps of:
    simultaneously energizing said vibrator sources after a preselected duration which said seismic energy receivers receive returned seismic energy from each of said vibrator sources.

7. A method as set forth in claim 4 which further comprises the steps of:
    compositing data received from each seismic energy source during a predesignated compositing domain.

8. A method as set forth in claim 6 which further comprises the steps of:
    compositing data received from each seismic energy source during a predesignated compositing domain.

9. A method as set forth in claim 7 wherein said predesignated compositing domain is delimited by seismic energy return derived during one quadrant of traverse of the sinusoidal path period for the respective paravane.

10. A method as set forth in claim 9 wherein the composited seismic energy trace data for each compositing domain will relate to a selected one of said plural related lines of seismic energy trace data each parallel to and transversely displaced from said line of survey.

11. A method as set forth in claim 7 wherein the composited seismic energy trace data for each compositing domain will relate to a selected one of said plural related lines of seismic energy trace data each parallel to and transversely displaced from said line of survey.

12. A method as set forth in claim 9 wherein for each paravane source, received and composited seismic data for sinusoidal path quadrants extending outward of said respective axial path will compile a first line of related seismic trace data, and received and seismic seixmic data for sinusoidal path quadrants extending inward of said respective axial path will compile a second line of related seismic trace data lying between said first line and said line of survey.

13. A method as set forth in claim 7 which is further characterized in that:
    said compositing domain is determined by a distance of tow vessel travel equal to one receiver channel length.

14. A method as set forth in claim 13 wherein said receiver channel length is a 440 foot linear array of plural, equi-spaced hydrophones.

15. A method as set forth in claim 8 which is further characterized in that:
    said compositing domain is determined by a distance of tow vessel travel equal to one receiver channel length.

* * * * *

UNITED STATES PATENT OFFICE
CERTIFICATE OF CORRECTION

PATENT NO. : 3,921,124
DATED : November 18, 1975
INVENTOR(S) : Charles E. Payton It is certified that error appears in the above-identified patent and that said Letters Patent are hereby corrected as shown below:

Column 6, line 37, after "received and" insert --composited--.
Column 6, line 37, after "seismic" delete --seixmic--.

Signed and Sealed this twenty-fourth Day of February 1976

[SEAL]

Attest:

RUTH C. MASON
Attesting Officer

C. MARSHALL DANN
Commissioner of Patents and Trademarks